J. T. HICKEY.
MEANS FOR PROTECTING ELECTRIC CONDUCTORS.
APPLICATION FILED APR. 10, 1913.

1,147,021.

Patented July 20, 1915.

Witnesses:
Dorothy L. Miatt
Lillia Miatt

Inventor:
James T. Hickey
By his Attorney
Geo. Wm. Miatt

UNITED STATES PATENT OFFICE.

JAMES T. HICKEY, OF RARITAN, NEW JERSEY, ASSIGNOR TO HICKEY AND SCHNEIDER, OF NEW YORK, N. Y., A FIRM.

MEANS FOR PROTECTING ELECTRIC CONDUCTORS.

1,147,021.  Specification of Letters Patent.  Patented July 20, 1915.

Application filed April 10, 1913. Serial No. 760,139.

*To all whom it may concern:*

Be it known that I, JAMES T. HICKEY, a citizen of the United States, and a resident of Raritan, county of Somerset, and State of New Jersey, have invented certain new and useful Improvements in Means for Protecting Electric Conductors, of which the following is a specification.

My invention relates to the protection of electric wire or cable conductors generally, but particularly to those subjected to currents of high tension or potential, where there is danger of electric leakage or discharge, heretofore frequently resulting in the deterioration or disintegration of the insulator or conductor, or both.

My means of protection are designed incidentally to reinforce the conductor and obviate mechanical abrasion or wear thereof, but mainly to prevent its burning or overheating in case of lateral electrical leakage by utilizing a protecting shield as the actual sparker or medium of discharge, and by the use of a metallic "ground" which protects both insulator and conductor from the otherwise deleterious effects of electrical leakage.

The invention consists primarily in combining the use, in conjunction with an insulator and an electrical conductor, of a metallic shield contacting with the conductor and so formed as to afford a short circuit or line of least resistance between the conductor and the "ground" which an electrical leak or discharge will naturally follow, thereby protecting the conductor against weakening or destruction by sparking, and for a like reason protecting the insulator against disintegration.

Secondarily the invention includes, in conjunction with the aforesaid short-circuit shield, a metallic "ground" interposed between the insulating means and the support thereof, said metallic "ground" extending beyond the insulating means so as to deflect the discharge from the protector shield away from the insulating means, thereby safeguarding both insulation and conductor.

Figure 1:
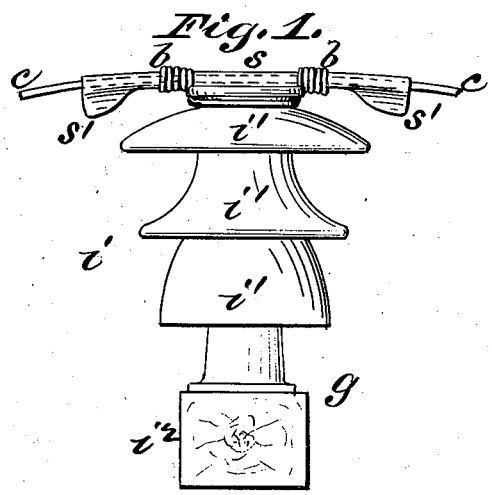
Figure 2:
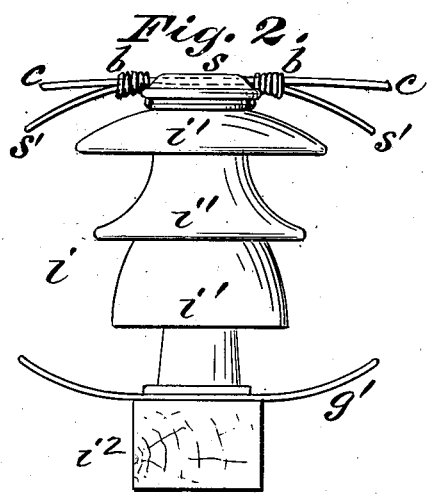
Figure 3:
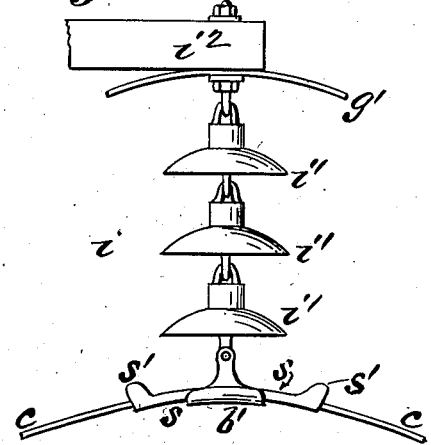
Figure 4:
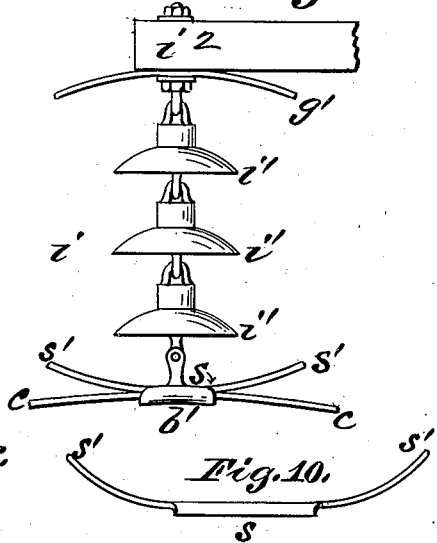
Figure 5:
Figure 7:
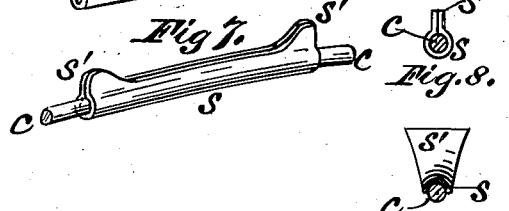
Figure 6:
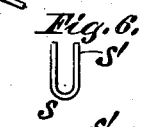
Figure 8:
Figure 9:
Figure 10:
Figure 11:
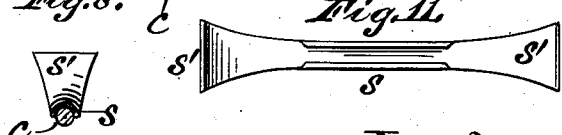
Figure 12:

In the accompanying drawings, Figures 1 and 2, are elevations showing the application of my means of protection to a conductor supported on a pin-type insulator; Figs. 3 and 4, similar views on a smaller scale illustrating the application of the invention to a suspension type of insulator; Fig. 5, is a perspective view of one form of my conductor shield; Fig. 6, an end view thereof; Fig. 7, a view showing one application of this form of shield to the conductor; Fig. 8, a sectional view of the conductor and end view of the shield with extensions closed, as in Fig. 7; Fig. 9, a similar view showing the discharge extensions spread apart; Fig. 10, is a side elevation and Fig. 11 a face view of a modified form of the shield; Fig. 12, an end view of same.

I herein illustrate the application of my invention to insulators designed for electric conductors $c$, for currents of high potential, the insulators $i$, being shown more or less symbolically, and as consisting as usual of a plurality of annular aprons $i'$, $i'$, supported or suspended one above the other as in the first four figures of the drawings.

My protector shield may be of various forms as may be desired or found most expedient, the device consisting essentially and primarily of a strip of metal formed with a contact portion $s$, for interposition between the conductor $c$, and the insulator $i$, the contact with the conductor being electrical, and the shield being formed with one or more protuberances $s'$, extending beyond the conductor and between it and the "ground" $g$, so as to afford a short circuit for leakage and sparking only and directly from the shield itself, thereby protecting the conductor from injury by blistering or burning,—heretofore a serious cause of damage and destruction of high tension conductors.

The form of the spark protuberance $s'$, is not material provided it is adapted to extend from the conductor $c$, toward the "ground" $g$, which latter may be the ordinary one constituted by the support of the insulator $i$, or more preferably a metallic ground plate $g'$, which I interpose between the insulator $i$, and its support $i^2$. By forming this ground plate $g'$, to extend out beyond the insulator as shown in Figs. 2 and 4 and toward the spark protuberance $s'$, of my conductor shield $s$, I am enabled to effectually protect both the conductor and the insulating means against the evil effects of electric leakage and sparking. Even in the absence of the "ground" plate $g'$, the shield $s$, by short-circuiting the escaping current protects the insulator as well as the conductor, but by the use of said ground plate $g'$, in conjunction with my protecting shield $s$, with its spark protuberance $s'$, interposed between the conductor and the ground I practically remove the line of short-circuit or leakage beyond the area of insulation, and eliminate all danger therefrom in so far as both insulator and conductor are concerned.

As before intimated the actual configuration of the shield $s$, and of the supplemental ground plate $g'$, are of secondary import and I do not limit myself to the forms herein shown. It is desirable however to form the main portion $s$, of the shield, (that interposed directly between the conductor $c$, and the insulator $i$,) in such manner that it may be made to embrace the conductor, in whole or in part; and the spark protuberances $s'$, may be made to extend variously, but always to protrude and intervene between the conductor and the ground, as shown in the first four figures of the drawings.

The means of securing the shield $s$, in place may also be varied, any suitable mechanical expedients being substituted for those shown,—that is to say, in lieu of the binding wires $b$, in Figs. 1 and 2, and the clasps $b'$, $b'$, shown in Figs. 3 and 4.

Besides rendering the conductor $c$, and insulator $i$, immune from the evil effects of high tension electrical discharge my shield $s$, also protects the conductor from wear and abrasion where attached to the insulator. In other words and in fact it reinforces and sustains the conductor mechanically as well as electrically, bearing the brunt of stress and strain, and distributing and diffusing the excess or leakage of current.

What I claim as my invention and desire to secure by Letters Patent is,

1. In a protector for electrical conductors, a shield comprising a strip of metal having a bendable portion to surround and contact with a conductor and provided with protuberances extending beyond the conductor, and means for securing the conductor and shield to an insulator.

2. In a protector for electrical conductors, a shield comprising a strip of metal having a bendable portion to surround and contact with a conductor and provided with protuberances extending beyond the conductor, and means embracing the shield for securing the conductor and shield to an insulator.

JAMES T. HICKEY.

Witnesses:
 GEO. WM. MIATT,
 LILLIA MIATT.